(12) United States Patent
Webb (10) Patent No.: US 8,545,183 B2
(45) Date of Patent: Oct. 1, 2013

(54) SEAL COATING BETWEEN ROTOR BLADE AND ROTOR DISK SLOT IN GAS TURBINE ENGINE

(75) Inventor: Rene James Webb, Notts (GB)

(73) Assignee: Siemens Aktiengesellschaft, Munich (DE)

(*) Notice: Subject to any disclaimer, the term of this patent is extended or adjusted under 35 U.S.C. 154(b) by 863 days.

(21) Appl. No.: 12/676,222

(22) PCT Filed: Aug. 26, 2008

(86) PCT No.: PCT/EP2008/061116
§ 371 (c)(1),
(2), (4) Date: Mar. 3, 2010

(87) PCT Pub. No.: WO2009/030606
PCT Pub. Date: Mar. 12, 2009

(65) Prior Publication Data
US 2010/0178169 A1    Jul. 15, 2010

(30) Foreign Application Priority Data
Sep. 6, 2007  (GB) .................................. 0717291.9

(51) Int. Cl.
*F01D 5/30* (2006.01)
(52) U.S. Cl.
USPC .................................. 416/219 R; 416/241 R
(58) Field of Classification Search
USPC ............... 416/219 R, 220 R, 248, 224, 241 R
See application file for complete search history.

(56) References Cited

U.S. PATENT DOCUMENTS

| 3,317,988 A * | 5/1967 | Endres ...................... 416/219 R |
| 3,910,719 A | 10/1975 | Hessler |
| 4,291,089 A | 9/1981 | Adamovic |
| 4,344,738 A | 8/1982 | Kelly et al. |
| 4,505,640 A | 3/1985 | Hsing |
| 4,626,169 A * | 12/1986 | Hsing et al. ............... 416/220 R |
| 4,790,723 A | 12/1988 | Clark, Jr. |
| 5,139,389 A | 8/1992 | Eng |
| 5,823,743 A | 10/1998 | Faulkner |
| 6,296,172 B1 | 10/2001 | Miller |
| 6,339,878 B1 | 1/2002 | Owen et al. |
| 6,575,704 B1 | 6/2003 | Tiemann |
| 2002/0044870 A1 | 4/2002 | Simonetti |
| 2005/0164027 A1* | 7/2005 | Lau et al. .................. 416/241 B |
| 2007/0048142 A1 | 3/2007 | Dambrine et al. |

FOREIGN PATENT DOCUMENTS

| DE | 886 676 A | 11/1952 |
| DE | 199 57 225 A1 | 6/2001 |
| DE | 10 2005 054 172 A1 | 5/2007 |
| EP | 0 587 341 B1 | 3/1996 |
| EP | 1 757 774 A2 | 2/2007 |
| GB | 2 224 082 A | 4/1990 |
| SU | 729370 A1 | 4/1980 |
| WO | WO 96/41068 | 12/1996 |

* cited by examiner

*Primary Examiner* — Richard Edgar (57) ABSTRACT

A gas turbine rotor blade and rotor disk arrangement is provided. The rotor blade and the rotor disk includes a coating in order to seal the gap which normally exists between the bottom part of the blade root and the bottom part of the disk slot. The coating may be applied to the blade root or to the disk itself on the bottom part of the disk slot. The coating is preferably an abradable nickel-alloy Bentonite coating. The coating may also be applied to only a portion of the areas being sealed, omitting a portion at the start of the slot or at the start of one of the lobes of the blade root, so that a lead-in is formed, whereby the blade can more easily be inserted into the slot.

14 Claims, 7 Drawing Sheets

SEAL COATING BETWEEN ROTOR BLADE AND ROTOR DISK SLOT IN GAS TURBINE ENGINE

CROSS REFERENCE TO RELATED APPLICATIONS

This application is the US National Stage of International Application No. PCT/EP2008/061116, filed Aug. 26, 2008 and claims the benefit thereof. The International Application claims the benefits of Great Britain application No. 0717291.9 GB filed Sep. 6, 2007. All of the applications are incorporated by reference herein in their entirety.

FIELD OF INVENTION

The invention relates to a rotor blade and a rotor disk for a gas-turbine engine.

BACKGROUND OF INVENTION

Figure 1:
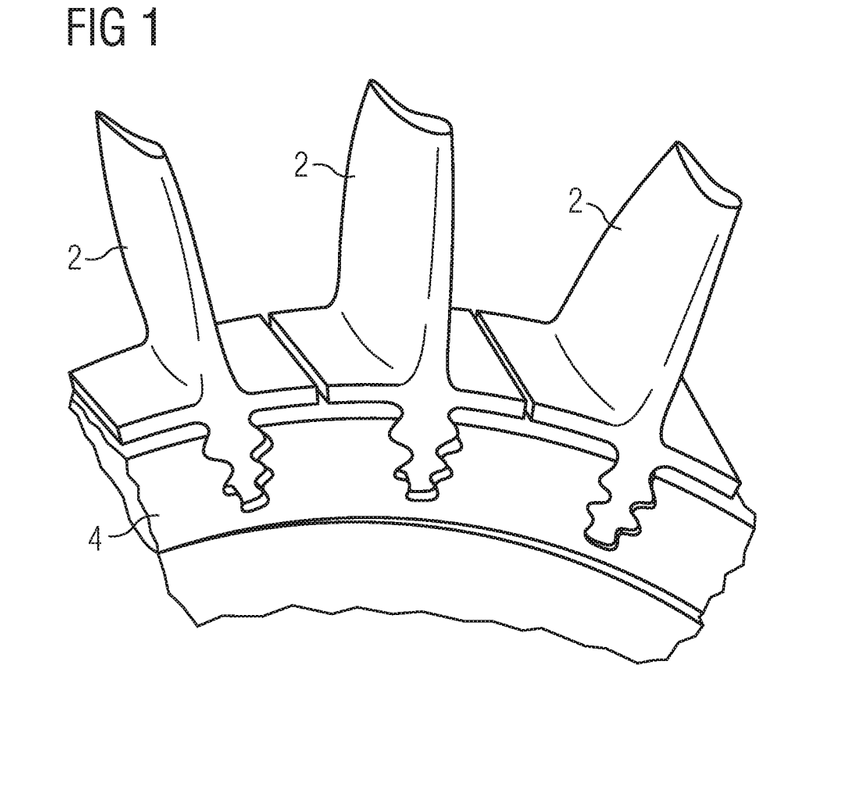
FIG. 1 is a perspective view of a typical rotor arrangement for a gas-turbine engine.

A typical gas-turbine rotor arrangement is shown as a partial perspective view in FIG. 1. The rotor arrangement, which is derived from U.S. Pat. No. 6,339,878, issued in the name of United Technologies Corp., comprises a series of rotor blades 2 anchored in a rotor disk 4. The rotor disk is attached to a shaft (not shown), which is rotated by the action of a working fluid on the rotor blades.

Figure 2A:
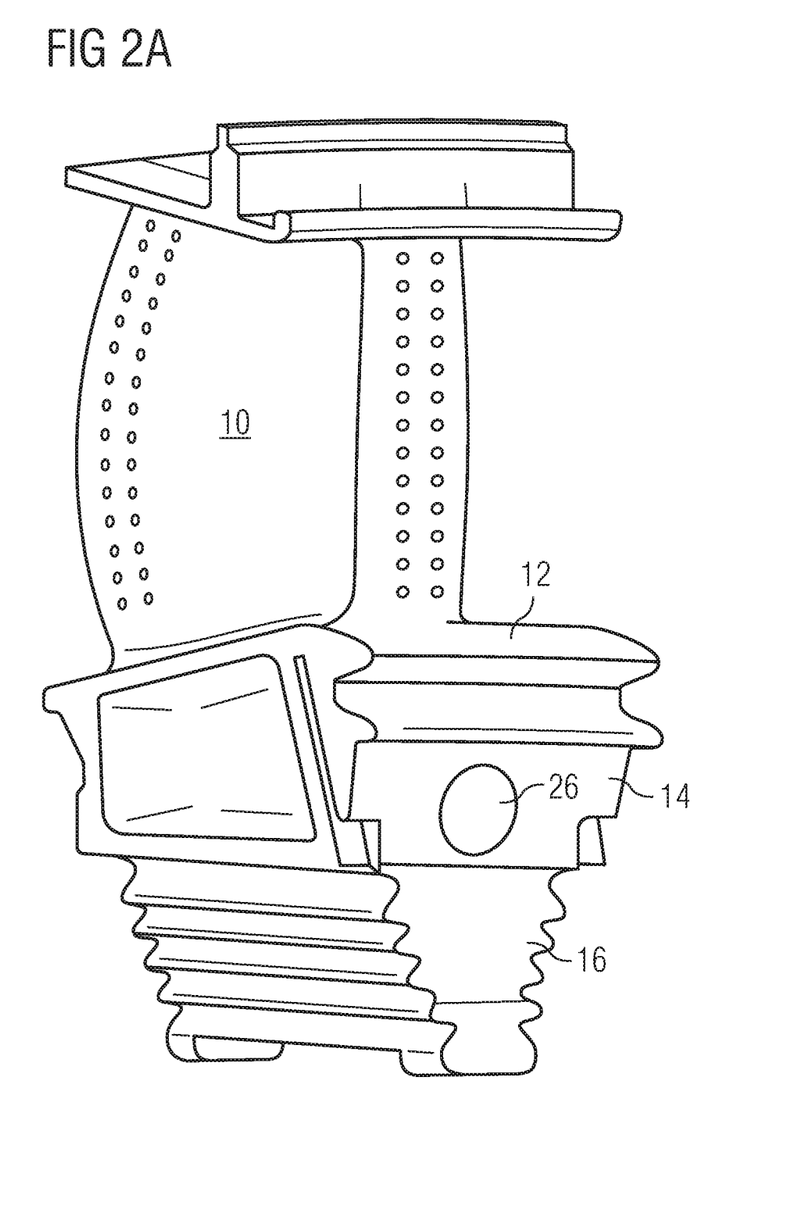
FIGS. 2(a) and 2(b) are perspective and side views, respectively, of a known rotor blade.
Figure 2B:
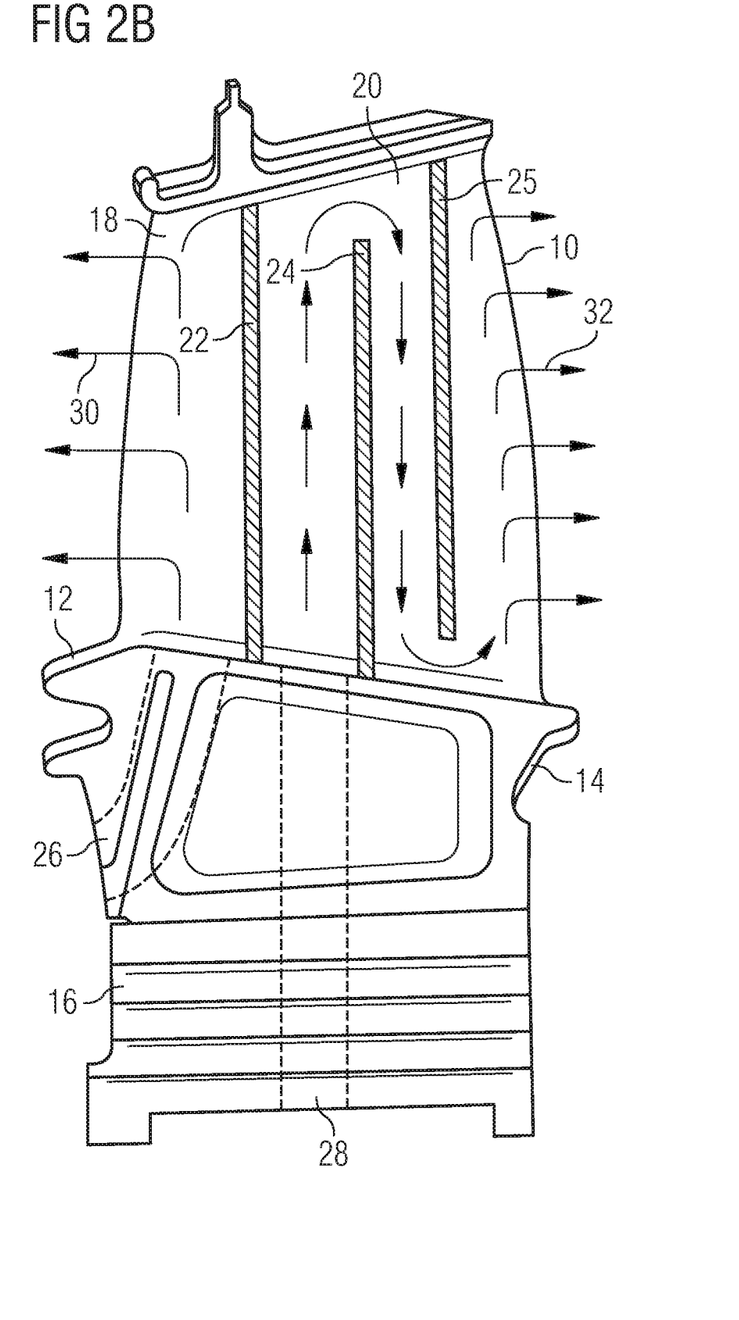

A more detailed view of a known type of rotor blade is shown in FIGS. 2(a) and 2(b). The blade is made up of an aerofoil section 10, a platform 12, a shank 14 and a root 16. The root 16 engages with a correspondingly shaped slot in a rotor disk. The root 16 is configured as the well known "fir tree" shape (see also FIG. 1), this being often preferred because of its excellent resistance against the centrifugal forces exerted upon the rotor blade when the disk is rotated at high speed.

In use, the blade is subjected to considerable stresses, due to the very high temperature of the working fluid flowing over the surface of the aerofoil section 10. In order to lengthen the life of the blade, the blade is often cooled by passing a cooling fluid through cooling ducts provided inside the blade. FIG. 2(b) shows two separate such ducts 18 and 20. Duct 18 is defined by the inside walls of the aerofoil section and a first partition 22, which isolates the duct 18 from the rest of the inside of the aerofoil section. Duct 20 is in three portions divided by second and third partitions 24 and 25. Partition 24 does not reach all the way to the top of the aerofoil section 10, but leaves a gap so that cooling fluid can flow from the first duct portion to the second. Similarly, partition 25 extends from the top of the aerofoil section 10, but ends short of the bottom of this section, so that the cooling fluid in the second portion of duct 20 can rise into the third portion of the same duct. In order to supply cooling fluid to the ducts 18 and 20, in the example shown two fluid inlets 26, 28 are provided. Cooling-fluid flow is then from outside the blade through the inlets 26, 28 and into the ducts 18, 20, as shown in FIG. 2(b). The fluid leaves the blade through holes provided in the leading and trailing edges of the aerofoil section, as shown by the arrows 30, 32, respectively (see also FIG. 2(a)). In some blades the cooling fluid may leave from the top of the aerofoil section (at the so-called "shroud").

In order to supply cooling fluid to the inlet 28 in FIG. 2(b), a duct is provided in the disk, which carries cooling fluid from outside the disk to the slot, from where it flows into the inlet 28. An example of this arrangement is given in FIGS. 3(a) and 3(b). This example is taken from U.S. Pat. No. 4,344,738 to assignee United Technologies Corp. and shows the fir-tree shaped slot 40, the duct 42 in the disk, an outlet 44 at the radially outer end of the duct 42, and an inlet 46 in an end-face of the disk. Also shown is the bottom portion 48 of the slot and the direction of flow 50 of the hot working gases. Cooling fluid passes through a bore section 52 along a flowpath 54 and turns in a radial direction, where it passes along a further flowpath 56 (see arrows 58). The fluid then enters the inlet 46, passes through the duct 42 and leaves at the outlet 44, where it finally enters a cooling passage in the blade 58, similar to that associated with the inlet 28 in FIG. 2(b).

Figures 3A, 3B:
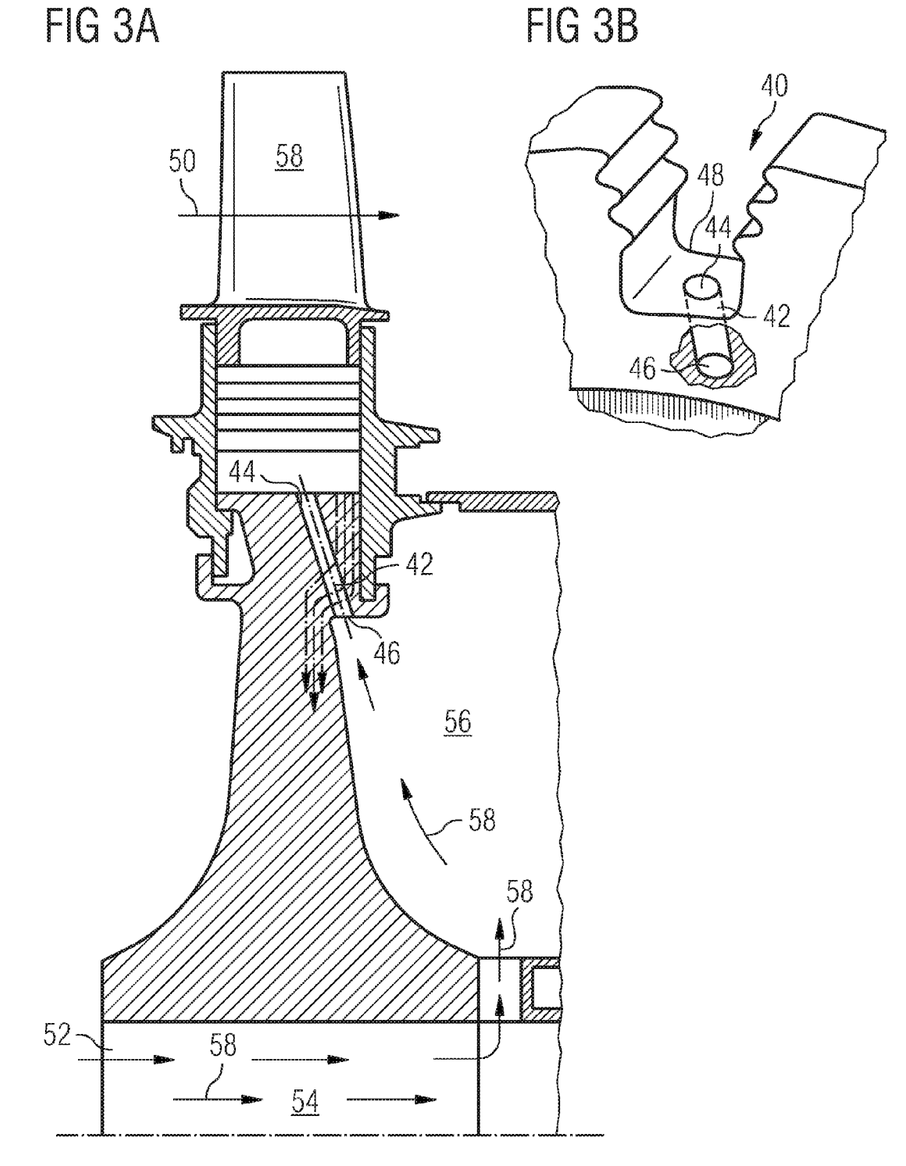
Figure 4:
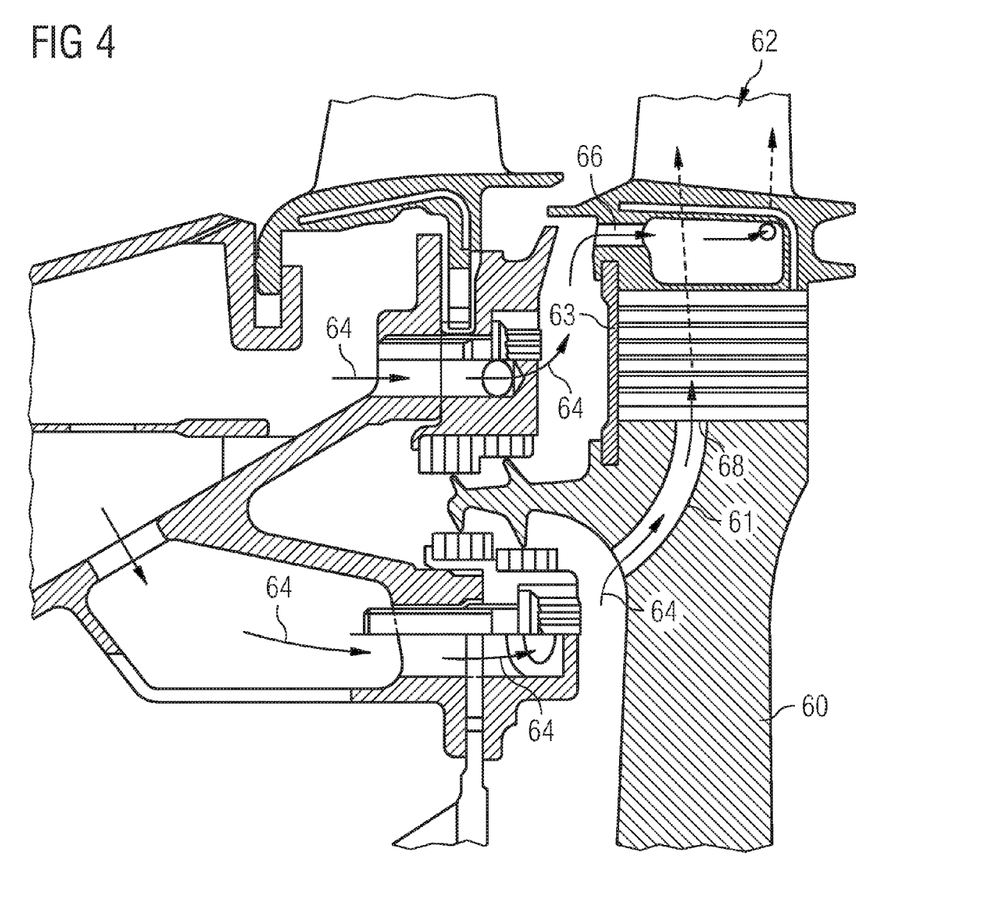
FIG. 4 is an axial section through a further known rotor-blade cooling arrangement.

As regards the inlet 26 shown in FIGS. 2(a) and 2(b), this may be supplied with cooling fluid in the manner shown in FIG. 4. FIG. 4 is derived from German Patent Application No. DE 19957225 filed in the name of Rolls Royce Deutschland and shows a partial side view of a rotor disk 60 and rotor blade 62, as mounted in a high-pressure gas turbine engine. The blade is air-cooled by the flow of cooling air 64, which is fed to an inlet 66 in a shank portion of the blade and to an inlet 68 on the underside of the root portion. The inlets 66 and 68 correspond to the inlets 26 and 28, respectively, in FIG. 2(b). Thus, this system is similar to that of FIG. 3, since it supplies cooling air to the blade through the root portion, but complements that with a parallel supply through the shank portion as well.

It should be noted that separate inlets 26 and 28 are not always employed feeding separate cooling ducts 18, 20. Instead either inlet 26 or inlet 28 may be included and these inlets may carry cooling fluid to the whole of the inside of the aerofoil section 10. Also, instead of a single inlet 26 or a single inlet 28, more than one inlet may be employed in either position—for example inlet 28 may be formed as a pair of adjacent inlets and these may supply either separate ducts 18, 20 or a single duct.

It is a problem with these known cooling arrangements that not all the cooling fluid supplied to the disk reaches the cooling duct or ducts in the blades. It is therefore desirable to be able to reduce the cooling-fluid losses, so that the temperature-related stress on the blades can be reduced.

SUMMARY OF INVENTION

According to the present invention there is provided a rotor blade and a rotor disk for a gas-turbine engine, the rotor blade comprising an aerofoil portion and a root portion, the rotor disk including a slot in which is secured the root portion of the rotor blade, the root portion of the rotor blade having: a pair of side portions, which mate with corresponding side portions of the rotor-disk slot, and a bottom portion connecting said side portions, wherein a coating seals a gap between said bottom portion and a bottom portion of said rotor-disk slot, the coating being on the bottom portion of the root portion of the rotor blade and/or on the bottom portion of the rotor disk slot, wherein the rotor blade is a turbine blade driven by a working fluid, wherein the aerofoil portion of the rotor blade has one or more cooling ducts for receiving a cooling fluid.

The said coating may be a porous metal coating. The coating may comprise nickel or a nickel alloy.

The coating may comprise a matrix material with one or more additives. The additives may be selected from a group consisting of: polymers, graphite, bentonite and boron nitride.

The coating may be selected from a group consisting of: commercially pure aluminium, an aluminium-silicon alloy, an aluminium quasicrystal alloy, a nickel graphite composite, a nickel-aluminium alloy and composite, a silicon-aluminum graphite composite, a silicon-aluminum+polyester blend, a silicon-aluminum+polyimide blend, a nickel-chrome+polyester blend, a nickel-chrome+polyurethane blend, a nickel-chrome+bentonite blend, a nickel-chrome-aluminum/bentonite blend, a nickel-chrome+boron nitride blend, a nickel-chrome+hollow spheres blend, a nickel-chrome-iron+boron nitride blend, an MCrAlY alloy, an exothermic MCrAlY alloy, and an yttria-zirconia+polyester blend.

The coating may comprise an Ni4Cr4Al21 layer on a calcined Bentonite core.

The rotor blade and the rotor disk may further comprise an MCrAlY bond coat between the blade/disk substrate and the coating.

The bottom portion of the rotor blade may comprise at least one lobe portion, said coating being on one or more of the at least one lobe portion or on a part of the bottom portion of the rotor disk slot which lies opposite one or more of the at least one lobe portion. More specifically, the bottom portion of the rotor blade may comprise first and second lobe portions, said coating being (i) on one of said first and second lobe portions only on a part thereof which is disposed nearer the other of said first and second lobe portions, or (ii) on the bottom portion of the rotor disk slot such that it lies opposite only a part of one of the first and second lobe portions which is disposed nearer the other of the first and second lobe portions.

The coating may have a maximum thickness over its area of between 0.5 mm and 0.7 mm.

BRIEF DESCRIPTION OF THE DRAWINGS

An embodiment of the invention will now be described, by way of example only, with the aid of the drawings, of which:

FIG. 3(a) is a side view of a known rotor-blade cooling arrangement, while FIG. 3(b) shows a perspective view of a rotor slot employed in FIG. 3(a);

DETAILED DESCRIPTION OF INVENTION

The inventor has recognised that a particularly significant area of leakage that can occur is the space that conventionally exists between the bottom of a rotor blade and the disk slot, which accommodates the blade.

Figure 5:
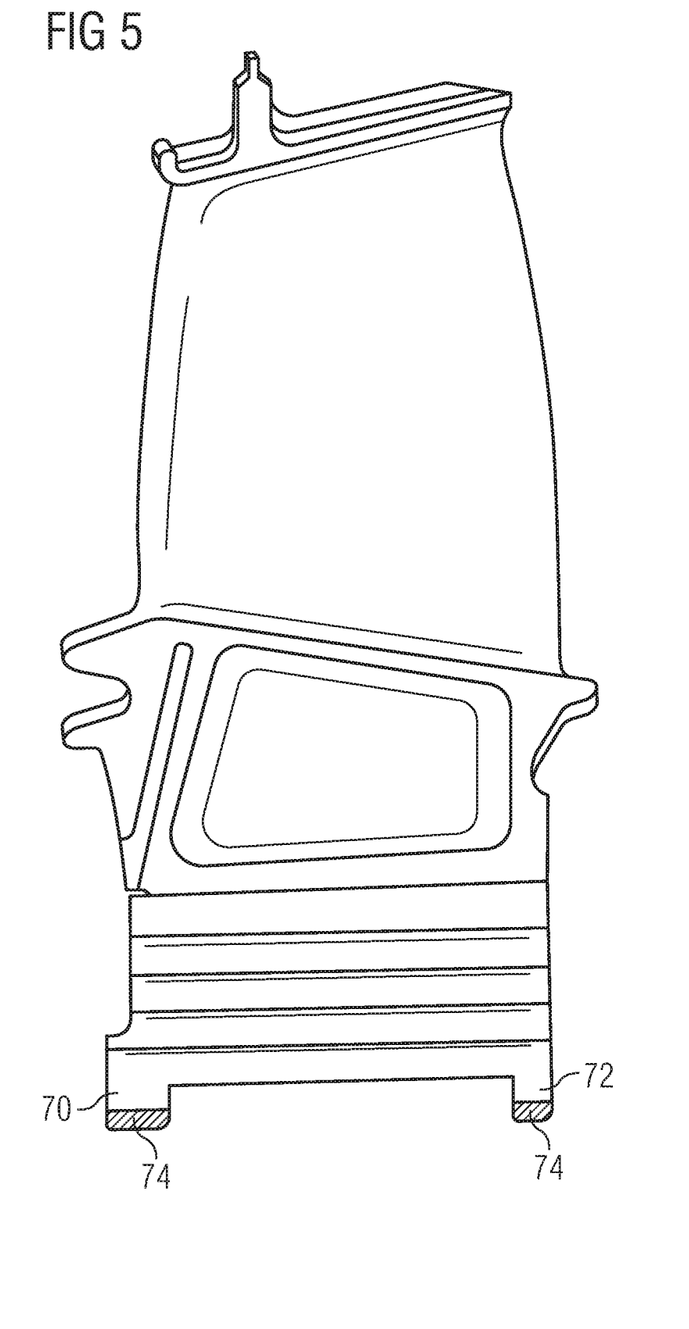
FIG. 5 shows, in a side view, a first embodiment of a rotor blade in accordance with the present invention.
Figure 6:
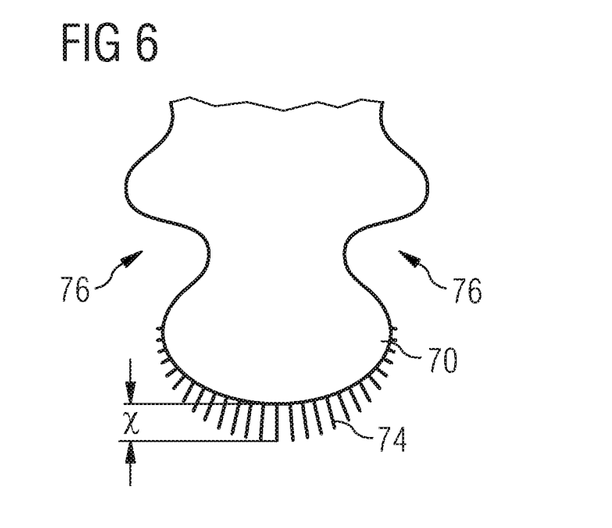
FIG. 6 is an end-view of part of a root portion of the rotor blade of FIG. 5.

Turning now to FIG. 5, this is a side view of a rotor blade similar to that shown in FIG. 2(b), but in which a coating has been applied to the bottom portion of the blade root. The bottom portion comprises a pair of lobes 70, 72 and the coating 74 is applied to the underside of those lobes. A front view of the lobe 70 with its coating 74 is illustrated in FIG. 6.

The coating is an abradable coating and is made somewhat thicker than the anticipated gap that would otherwise exist between the underside of the lobes and the bottom portion of the disk slot. A typical example might be to apply between, say, 0.5 and 0.75 mm of coating to the lobes. This dimension is shown as dimension x in FIG. 6 and refers to the area of maximum coating thickness, as shown. With the lobe shown, the thickness diminishes as the coating extends toward the side portions 76 of the root. The degree of variation in the coating thickness will depend on the profile of the lobe in relation to the shape of the floor of the rotor-disk slot. For example, when the lobes are almost flat at the bottom, and the slot floor is similarly shaped, then the coating thickness will be essentially constant over most of the area of the lobe. In the illustrated example it is assumed that the slot floor is curved in the manner shown by the outer profile of the coating 74. When the blades are inserted into their slots, some of the coating will be removed, leaving a very tight fit between the lobes and the bottom of the slot.

When the blade is mounted in the disk, this coating effectively seals the space that would otherwise exist between the lobes 70, 72 and the bottom of the slot 48 (see FIG. 3(b)). Thus, referring again to FIG. 4, the cooling air 64 is confined to flow through passage 61 directly into the blade root via the inlet 68, and also to flow through the inlet 66 in the blade shank without being diverted underneath the blade lobe at the upstream side of the blades, underneath the blade lobe at the downstream side of the blades and on out of the rotor. In this way the efficiency of operation of the rotor is enhanced. (It is assumed, in what has just been said, that the locking plate 63 shown in FIG. 4 is not present, as is the case with many gas-turbine systems. This is because a locking plate not only prevents unwanted axial movements of the blade inside the slot, but it also seals the leakage path between the underside of the blade and the slot bottom 48 (see FIG. 3(b).) Incidentally, it should be noted that the losses, which are prevented by the present invention, are roughly in proportion to the size of the gap that would otherwise exist between the underside of the blade root and the bottom of the disk slot.

The matter of the material used for the coating will now be addressed.

The type of coating material used depends at least partly on the expected temperature that the blade will reach during operation. The temperature at the rim of a turbine disk, for example, is likely to reach a temperature in the range of 300° C.-700° C. On that basis, there are two main options for applying the coating. A first option is to apply the coating by spraying on layers of a porous metal, which is then compressed and shaved off (i.e. abraded) during assembly of the blade in the disk slot. The metal or alloy used should have a melting temperature, which is higher than the expected operating temperature. Nickel, or an alloy thereof, is one example of such a metal. Whichever metal is used, care should be taken that it does not have a deleterious effect on the other materials present in the turbine. One example of such a metal is copper, which may interfere with the integrity of nickel-based alloys used elsewhere in the turbine.

A second option is to use a dense and uniformly structured coating with one or more additives such as polymers, graphite, bentonite and boron nitride. The additives weaken the matrix material and can provide some degree of dry lubrication, which is useful when the blade is to be mounted in the disk.

Coatings for lower-temperature applications, i.e. <650° C. approximately are preferably applied over a nickel-aluminium bond coat. Abradable materials include: commercially pure aluminium, aluminum-silicon alloys, aluminum quasicrystal alloy, nickel graphite composites, nickel-aluminium alloys and composites, silicon-aluminum graphite composites, silicon-aluminum+polyester blends, silicon-aluminum+polyimide blends, nickel-chrome+polyester blends, nickel-chrome+polyurethane blends, nickel-chrome+bentonite blends, nickel-chrome-aluminum/bentonite blends, nickel-chrome+boron nitride blends, nickel-chrome+hollow spheres blends, and nickel-chrome-iron+boron nitride blends.

Coatings for engine sections where temperatures are very hot, i.e. >649° C. approximately, necessitate the use of high-temperature materials which are easily abraded. Such high temperature abradables include: MCrAlY type alloys, exothermic MCrAlY's, nickel-chrome-aluminum/bentonite blends and yttria-zirconia+polyester blends. The term "MCrAlY" is a well-known shorthand way of referring to temperature and oxidation/corrosion resistant alloy systems comprising one or more of nickel, cobalt and iron as the major "M" component, together with chromium and aluminium in quite large amounts, plus a small amount of yttrium or other rare-earth element. These alloys are discussed in, for example, European Patent Application No. 0587341 B1, filed in the name of Rolls-Royce plc. This specification is incorporated herein, by way of reference. In the present application, the "M" component is preferably nickel.

A preferred coating material from the lower-temperature group is a Ni-based abradable material, while from the higher-temperature group a Ni-based material comprising graphite or bentonite is preferable. A concrete example of a Ni-bentonite material is "Metco 314™". This material consists of a nickel-chromium-aluminium alloy coated onto a bentonite particulate core. Details of this material and some specific proportions between the alloy components are contained in U.S. Pat. No. 4,291,089 to Adamovic, which is incorporated herein by way of reference. Other Metco materials are equally possible, however—e.g. Metco 312™. An example of this sort of material is one composed of an Ni4Cr4Al21 layer on a calcined Bentonite core.

In practice, the insertion of the blades into their respective slots in the rotor disk could prove to be a difficult exercise, due to the fact that the coating is thicker than necessary to fill the gap. Ideally, the blade root should be accurately aligned with the slot and, once the blade has been offered up to the slot, it should be pushed straight forward without any twisting, etc. This could require the use of tooling to achieve the necessary alignment. It is also important to avoid chunks of the coating falling off while the blade is being pushed into the slot. This, however, is readily achieved by the use of an abradable material, such as mentioned above, provided the coating is not too thick.

Figure 7:
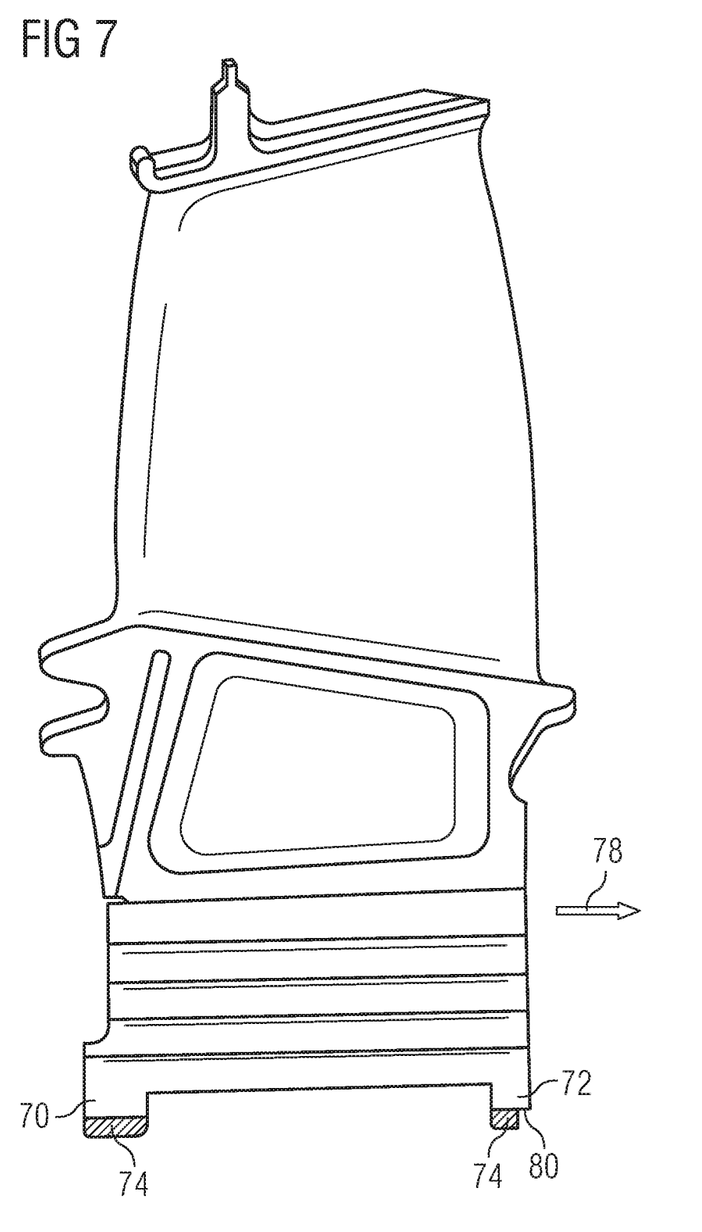
FIG. 7 shows, in a side view, a second embodiment of a rotor blade in accordance with the present invention.

To render insertion of the blade easier, the invention in a second embodiment thereof envisages a coating arrangement as shown in FIG. 7. In FIG. 7 the coating 74 is applied to only part of the lobe 72, this lobe being at the end of the root which is inserted first into the disk slot. This end is the "aft" end in the blade shown, and corresponds to the trailing edge of the aerofoil profile. Thus the direction of insertion is shown by the arrow 78. The uncoated part of the lobe 72 acts as a "lead-in" portion 80, making it much easier to insert the blade. This measure reduces the likelihood that special tooling will be required, as mentioned earlier.

In an alternative arrangement, the lead-in is provided at the leading edge of the blade aerofoil section, i.e. on lobe 70. This assumes that this edge of the blade will be inserted first into the slot.

The coating arrangement in accordance with the second embodiment is satisfactory, provided the coating, which lies at the end of the lobe 72 disposed nearer to the lobe 70, covers enough of the area of the lobe to create a reliable seal. This is easily achieved, since only a small lead-in portion 80, referred to the direction 78, is required. The same applies when the lead-in is part of lobe 70, rather than lobe 72.

Although lobe 70 will normally be fully coated, as shown in FIG. 5, this lobe also could be only partially coated. In this case, lobe 70 may be coated either at its upstream end, its downstream end or at some intermediate point. This is not to create a lead-in, like that shown as item 80 in FIG. 7, but merely to save on materials costs. The same criterion applies here as to the coating on lobe 72, namely to ensure that sufficient area of the lobe 70 is covered to create a reliable seal. A similar consideration exists in respect of lobe 72, when the lead-in is part of lobe 70.

A third embodiment of the invention will now be described.

In this third embodiment, instead of applying the coating to the blade, it is applied to the bottom portion 48 of the disk slot (see FIG. 3(b)). In this case the coating is applied to those areas of the bottom portion, which will correspond to the location of the lobes 70, 72 when the blade is inserted into the slot. Exactly the same coating considerations apply here as with the first and second embodiments. Hence, for instance, a shorter coating may be applied, provided it seals enough of the surface area of the two lobes. The same lead-in may be provided, this time in the part of the bottom portion 48 which will first receive the blade root when the blade is inserted.

It is to be noted that the third embodiment runs the risk that the portions of the coating that are abraded from the disk slot during assembly will end up inside the cooling ducts of the turbine blade, thereby reducing cooling efficiency.

A fourth embodiment of the invention applies a thinner coating to each of the blade root and the bottom portion of the slot. The end result is the same, namely abrasion of both of these coatings as the blade is fully inserted, and the consequent creation of a seal between the root and the bottom portion of the slot. Although this scheme is possible, it will not be generally found to be practicable, since it will be easier to coat one or other of the root and the slot. Indeed, it will normally be preferable to coat only the root, since this is easier in practice than coating each individual slot in a disk. Furthermore, this fourth embodiment has the drawback that an interface is created between the two coatings where they meet. This interface may be a source of weakness as far as the integrity of the seal is concerned.

Although the invention has been described in connection with a fir-tree type turbine rotor blade and disk, it is not limited to this. Indeed, the invention will apply to any type of turbine rotor blade and disk, where a gap normally exists between the bottom part of the blade root and the corresponding part of the disk slot. However, care should be taken where the gap is very large, since this would require a correspondingly thick coating. Such a coating would then have to be of a material which is not too fragile, since otherwise it would be likely to fall off or become easily damaged before the blade has been inserted. The limits of coating thickness in any given situation can be established by simple experiment using different materials, as necessary. Present technology allows coating thicknesses of the order of 2 mm without significant risk of damage to the coating during assembly. It is expected that future development in this area will allow even thicker coatings to be applied, as has happened in the field of Thermal Barrier Coatings (TBC). Alternatively, a coating which is applied to both blade and disk, as mentioned earlier, may be advantageous where the gap is large, since each part-coating can afford to be thinner, while still achieving the required sealing effect.

Whereas the invention has assumed the existence of two root lobes, which are both coated, the invention is not limited to this, and can be employed where there are more or less than two lobes. Thus, applications involving only one lobe can employ the present invention, though a more reliable sealing effect can be achieved through the use of more than one sealing point. This sealing point (i.e. lobe) may be at either end of the blade root and/or disk slot, or at some intermediate point.

The invention claimed is:

1. A rotor blade and a rotor disk for a gas-turbine engine, the rotor blade comprising:
   an aerofoil portion; and
   a root portion,
the rotor disk, comprising:
   a slot in which the root portion is secured,
   wherein the root portion includes a first pair of side portions, the first pair of side portions mate with a corresponding second pair of side portions of the rotor-disk slot,
   wherein a first bottom portion connects the first pair of side portions,
   wherein a coating seals a gap between the first bottom portion and a second bottom portion of the slot,
   wherein the coating is on the first bottom portion and/or on the second bottom portion,
   wherein the rotor blade is a turbine blade driven by a working fluid, and
   wherein the aerofoil portion of the rotor blade includes a cooling duct for receiving a cooling fluid,
   wherein the first bottom portion comprises a lobe portion, and
   wherein the coating is on the lobe portion or on a part of the second bottom portion which lies opposite the lobe portion,
   wherein the first bottom portion comprises a first lobe portion and a second lobe portion, and
   wherein the coating is on one of the first or second lobe portions only and only on a part which is disposed closer to the other of the first or second lobe portions, or the coating is on the second bottom portion such that the coating lies opposite only the part of one of the first or second lobe portions which is disposed closer to the other of the first or second lobe portions.

2. The rotor blade and the rotor disk as claimed in claim 1, wherein the coating has a maximum thickness over its area of between 0.5 mm and 0.7 mm.

3. The rotor blade and the rotor disk as claimed in claim 1, wherein the coating is a porous metal coating.

4. The rotor blade and the rotor disk as claimed in claim 3, wherein the coating is applied by spraying on a plurality of layers of the porous metal coating, which is then compressed and shaved off during an assembly of the rotor blade in the slot.

5. The rotor blade and the rotor disk as claimed in claim 3, wherein the coating comprises nickel.

6. The rotor blade and the rotor disk as claimed in claim 3, wherein the coating comprises a nickel alloy.

7. The rotor blade and the rotor disk as claimed in claim 1, wherein the coating comprises a matrix material with an additive.

8. The rotor blade and the rotor disk as claimed in claim 7, wherein the coating is selected from the group consisting of commercially pure aluminium, an aluminium-silicon alloy, an aluminium quasicrystal alloy, a nickel graphite composite, a nickel-aluminium alloy and composite, a silicon-aluminum graphite composite, a silicon-aluminum+polyester blend, a silicon-aluminum+polyimide blend, a nickel-chrome+polyester blend, a nickel-chrome+polyurethane blend, a nickel-chrome+bentonite blend, a nickel-chrome-aluminum/bentonite blend, a nickel-chrome+boron nitride blend, a nickel-chrome+hollow spheres blend, a nickel-chrome-iron+boron nitride blend, an MCrAlY alloy, an exothermic MCrAlY alloy, and an yttria-zirconia+polyester blend.

9. The rotor blade and the rotor disk as claimed in claim 8, further comprising an MCrAlY bond coat between the rotor blade and/or rotor disk substrate and the coating.

10. The rotor blade and the rotor disk as claimed in claim 8, wherein the coating comprises a Ni4Cr4Al21 layer on a calcined Bentonite core.

11. The rotor blade and the rotor disk as claimed in claim 10, further comprising an MCrAlY bond coat between the rotor blade and/or rotor disk substrate and the coating.

12. The rotor blade and the rotor disk as claimed in claim 1, further comprising an MCrAlY bond coat between the rotor blade and/or rotor disk substrate and the coating.

13. The rotor blade and the rotor disk as claimed in claim 1, wherein the additive is selected from a group consisting of polymers, graphite, bentonite and boron nitride.

14. The rotor blade and the rotor disk as claimed in claim 13, further comprising an MCrAlY bond coat between the rotor blade and/or rotor disk substrate and the coating.

* * * * *